United States Patent [19]

Kakuda

[11] Patent Number: 4,996,618
[45] Date of Patent: Feb. 26, 1991

[54] MAGNETIC DISK APPARATUS HAVING ADDITIONAL CARRIAGE ADAPTED TO PREVENT ADSORPTION OF MAGNETIC HEAD

[75] Inventor: Masatoshi Kakuda, Kanagawa, Japan

[73] Assignee: Mitsubishi Denki Kabushiki Kaisha, Tokyo, Japan

[21] Appl. No.: 300,577

[22] Filed: Jan. 23, 1989

[30] Foreign Application Priority Data

Jan. 26, 1988 [JP] Japan .................................. 63-15598

[51] Int. Cl.⁵ ........................ G11B 5/55; G11B 21/08
[52] U.S. Cl. .................................... 360/106; 360/105
[58] Field of Search ................ 360/106, 105, 104, 75, 360/103

[56] References Cited

U.S. PATENT DOCUMENTS

| | | | |
|---|---|---|---|
| 4,423,446 | 12/1983 | Takahashi et al. | 360/106 |
| 4,542,429 | 9/1985 | Nishida et al. | 360/103 |
| 4,706,142 | 11/1987 | Hattori et al. | 360/106 |
| 4,755,896 | 7/1988 | Okutsu | 360/105 |
| 4,758,914 | 7/1988 | Ishii | 360/105 |
| 4,807,072 | 2/1989 | Ono et al. | 360/105 |
| 4,833,550 | 5/1989 | Takizawa et al. | 360/75 |

OTHER PUBLICATIONS

Japanese Patent Public Disclosure No. 61-198480 date Sep. 2, 1986 Application No. 60-39128, dated Feb. 28, 1985, Entitled: Head-Attraction Releasing System.
Japanese Patent Public Disclosure No. 58-1858 date Jan. 7, 1983, Application No. 56-98559, dated Jun. 25, 1981, Entitled Magnetic Disk Device.
Japanese Patent Public Disclosure No. 58-6560 date Jan. 14, 1983, Application No. 56-102916, dated Jun. 30, 1981, Entitled Magnetic Disk Device.
Japanese Patent Public Disclosure No. 58-45670, date Mar. 16, 1983, Appln. No. 56-141256, dated Sep. 7, 1981, Entitled: Magnetic Disk Device.

Primary Examiner—John H. Wolff
Assistant Examiner—Craig Renner
Attorney, Agent, or Firm—Wolf, Greenfield & Sacks

[57] ABSTRACT

A magnetic disk apparatus comprises a magnetic disk for recording information thereon; a power supply; an electric motor for rotating the magnetic disk by means of electric power which is supplied from the power supply; a floating type magnetic head for recording/reproducing the information onto/from the magnetic disk; and a carriage for moving and positioning the magnetic head on the magnetic disk by means of electric power supplied from the power supply, wherein when the rotation of the magnetic disk is started, the magnetic head rises from a predetermined CSS position on the magnetic disk, and when the rotation of the magnetic disk is stopped, the magnetic head comes to rest at the CSS position. The magnetic disk apparatus is characterized by including an additional carriage enabling the magnetic head to move between the CSS position and a standby position near the CSS position where a CSS operation cannot be executed, so that (1) when the electric power from the power supply to the electric motor is shut off and the rotation of the magnetic disk is stopped, the magnetic head is moved from the CSS position to the standby position, and (2) when the electric power is supplied from the power supply to the electric motor, the magnetic head is moved from the standby position to the CSS position prior to the rotation of the magnetic disk.

8 Claims, 7 Drawing Sheets

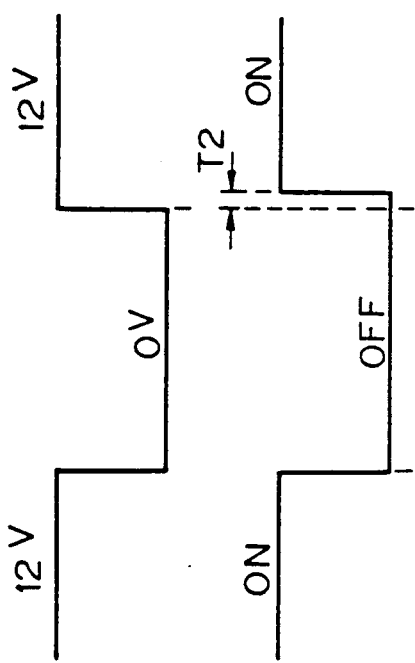
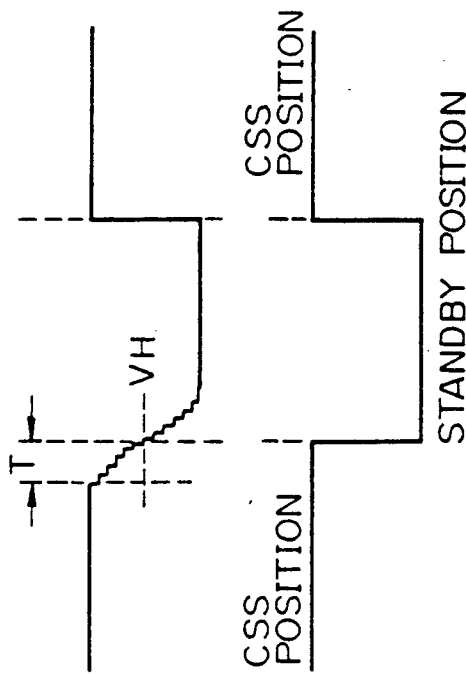
Fig. 7A  POWER SOURCE VOLTAGE VA
Fig. 7B  RELAY K1
Fig. 7C  SOLENOID (7) APPLIED VOLTAGE
Fig. 7D  OPERATING POSITION OF SOLENOID (7), ARMATURE (8)

Fig. 9
Fig. 10
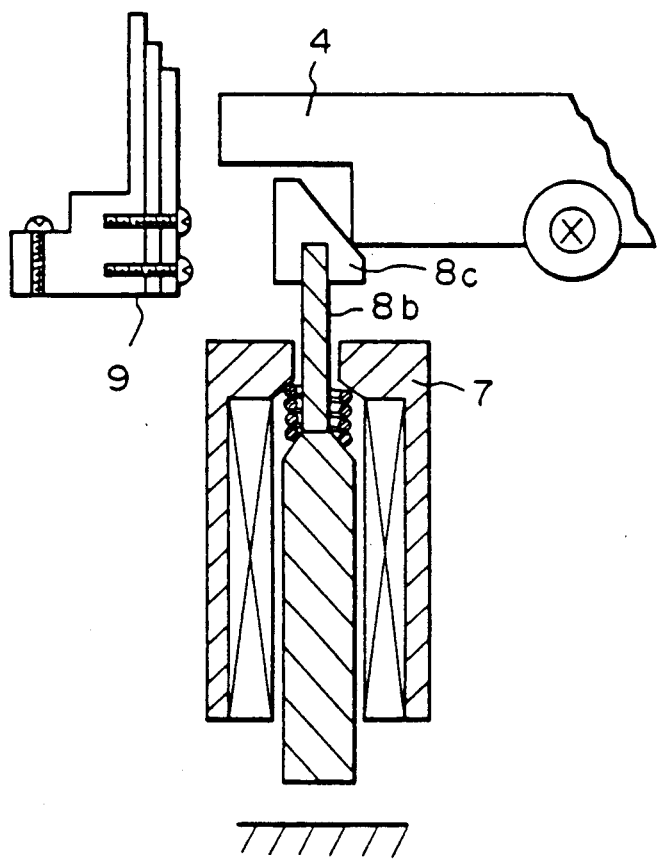
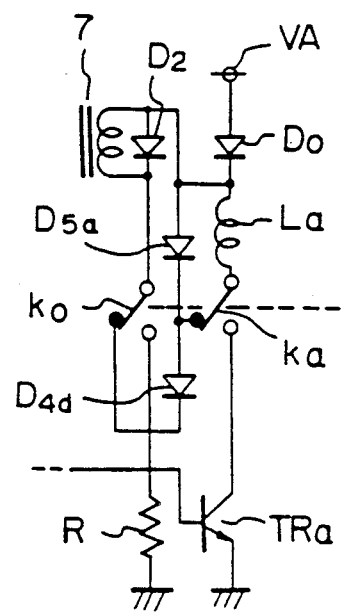
Fig. 11
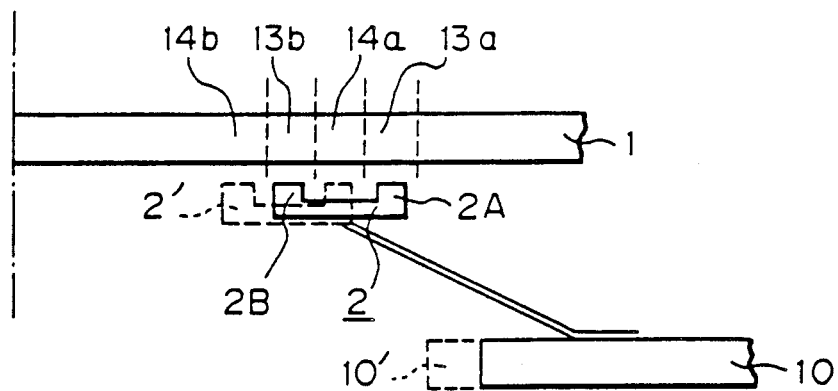

MAGNETIC DISK APPARATUS HAVING ADDITIONAL CARRIAGE ADAPTED TO PREVENT ADSORPTION OF MAGNETIC HEAD

FIELD OF THE INVENTION

The present invention relates to a magnetic disk apparatus which is used as an external memory device of an electronic computer and, more particularly, to a magnetic disk apparatus which is adapted to prevent a magnetic head from being affected by the adsorption phenomenon.

RELATED BACKGROUND ART

A recent type of magnetic disk apparatus has a design based on what is called the Winchester technique. A magnetic disk starts rotating in a state of being in contact with the magnetic head. As the rotational speed of the magnetic disk on which magnetic head slides increases, the magnetic head rises due to the air stream induced between the magnetic head and the magnetic disk. The recording and reproducing operations are executed with the magnetic head in such a floating state. When the rotation of the magnetic disk stops, the magnetic head again rests on the surface of the magnetic disk. Such an operation of the magnetic head is generally called a contact-start-stop (abbreviated to CSS) operation. Such this CSS operation represents a kind of abrasion phenomenon, the characteristics of the magnetic head and magnetic disk deteriorate with any increase in rotational speed. There is a particularly remarkable tendency for the coefficient of abrasion between the magnetic head and the magnetic disk to gradually increase, and there may be a case where the friction coefficient exceeds "1". Such a state is called an adsoption state. When this adsorption state occurs, the load torque of the motor which drives the magnetic disk is larger than the starting torque thereof, so that not only is a starting error caused but also excessive force is applied to the magnetic head and magnetic disk system, causing certain parts to be broken.

Since no active countermeasures are taken against the adsorption phenomenon in regard to the magnetic head of a conventional magnetic disk apparatus of this type, there is a significant deficiency in reliability.

SUMMARY OF THE INVENTION

The present invention has been achieved in order to solve the foregoing problems and it is an object of the invention therefore, to provide a magnetic disk apparatus in which a magnetic disk is activated without causing the adsorption phenomenon that would otherwise occur between a magnetic head and the magnetic disk, thereby providing high reliability.

A magnetic disk apparatus according to the present invention has an additional carriage (solenoid) which is constructed in such a manner that, when an external power source is shut off and a magnetic disk is then stopped, the magnetic head is moved to a standby position near a CSS position, and when the external power source is switched on, the magnetic head is moved from the standby position back to the CSS position before the magnetic disk is rotated.

When the external power source is switched on, the solenoid drives the main carriage to set the magnetic head in the CSS position. When the external power source is cut off, the solenoid is deenergized to move the carriage to a position different from the CSS position, thereby setting the magnetic head in the standby position.

According to the magnetic disk apparatus of the invention, an additional carriage is provided which is constructed in such a manner than when the external power source is shut off and a magnetic disk is then stopped, the magnetic head is moved to a standby position near the CSS position, and when the external power source is switched on, the magnetic head is brought back from the standby position to the CSS position before the magnetic disk is rotated. In this way the magnetic disk can be initially driven without causing the adsorption phenomenon that would otherwise occur between the magnetic head and the magnetic disk, and the attendant deterioration in the characteristics of the magnetic head and magnetic disk due to abrasion can be suppressed. This offers the great benefit that a magnetic disk apparatus of a high reliability can be provided.

BRIEF DESCRIPTION OF THE DRAWINGS

FIG. 7 (A-D) is a timing chart illustrating the operation of the solenoid;

FIG. 9 is a cross-sectional view of a construction including a solenoid according to another embodiment of the present invention;

FIG. 10 is an electrical circuit diagram showing a drive circuit of the solenoid in another embodiment; and FIG. 11 is an arrangement diagram showing the relationship between a CSS position and a standby position in another embodiment.

DESCRIPTION OF THE PREFERRED EMBODIMENTS

Figure 1:
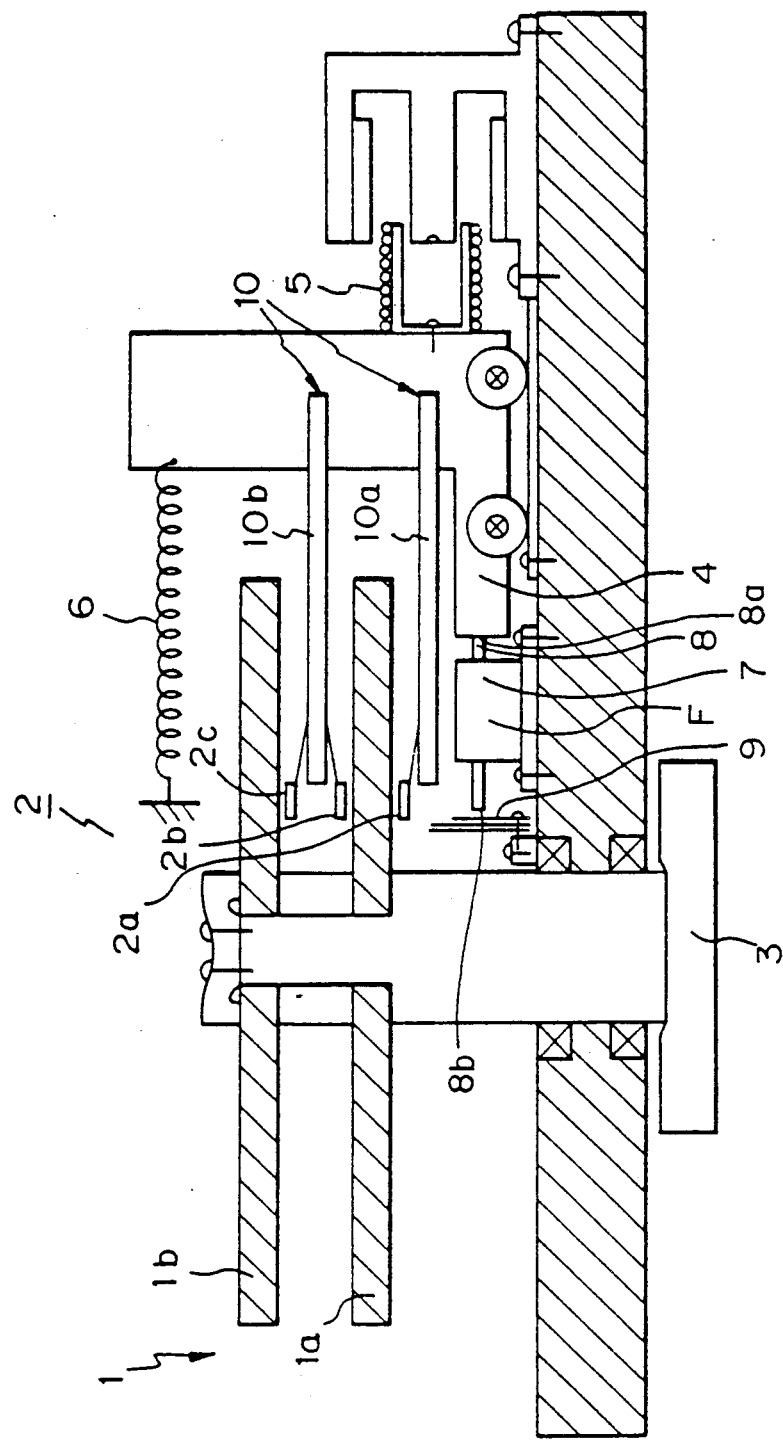
FIG. 1 is a cross-sectional view showing an arrangement of a magnetic disk apparatus according to an embodiment of the present invention.

FIG. 1 is a cross-sectional view showing a magnetic disk apparatus according to an embodiment of the present invention. In the diagram, reference numeral 1 denotes a magnetic disk for recording information; 2 is a magnetic head for recording or reproducing information onto or from the magnetic disk; 3 a DC direct drive motor for rotating the magnetic disk 1; 4 a carriage for positioning the magnetic head 2; 5 a voice coil for applying a drive force to the carriage 4; and 6 a spring for attracting the carriage 4 in one direction when no current is supplied to the voice coil 5. A solenoid 7 which acts as an additional carriage F is provided at the front edge of the carriage 4. One end 8a of an armature 8 which acts as a movable portion of the solenoid 7 is in contact with the carriage 4. The other end 8b of the armature 8 faces a carriage stopper 9. The magnetic head 2 is provided on the carriage 4 through a head arm 10 and they all move together. Reference numeral 1 generally represents 1a and 1b; 2 represents 2a, 2b and 2c; and 10 represents 10a and 10b, respectively.

Figure 2:
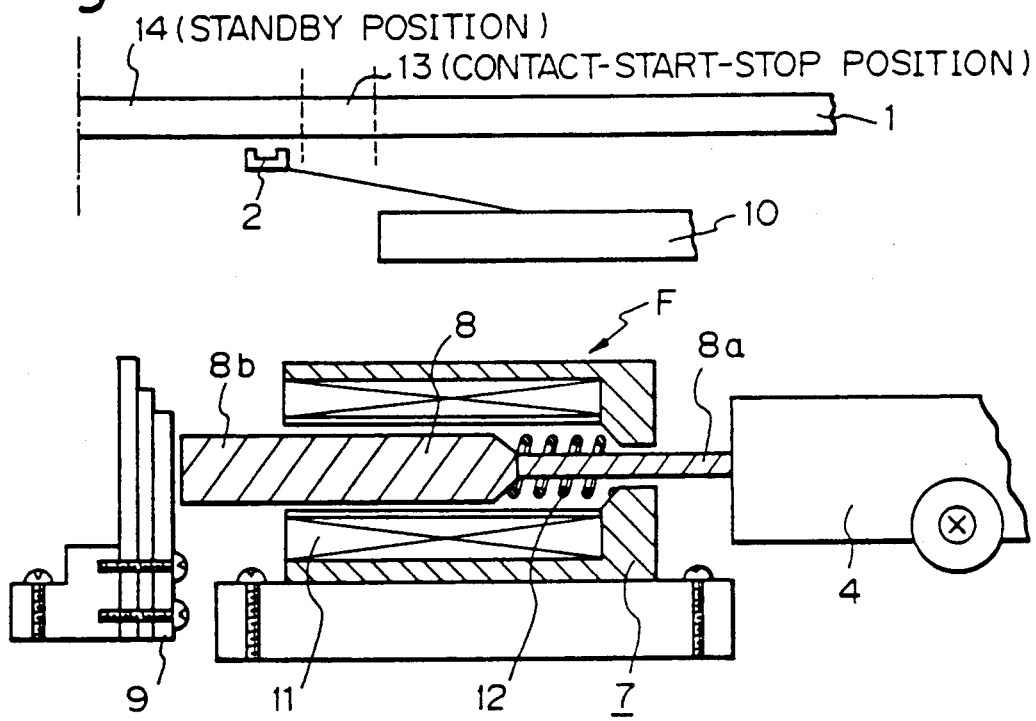
FIGS. 2 and 3 are cross-sectional views of a construction including a solenoid, which illustrate the operation of the solenoid in FIG. 1.
Figure 3:
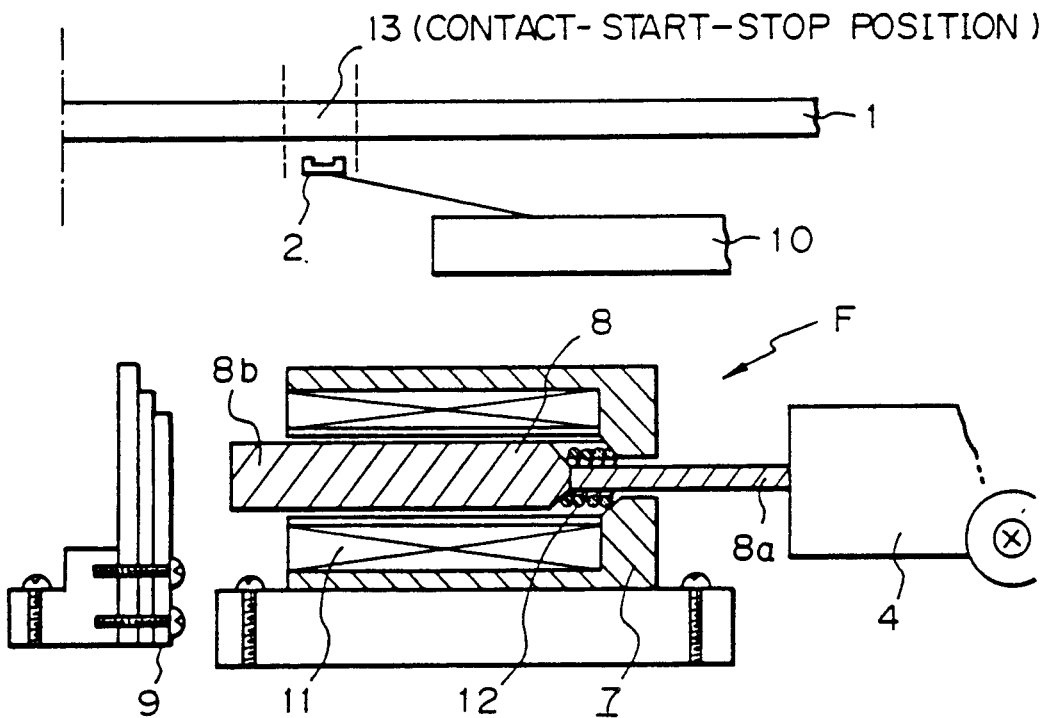

The operation of the solenoid 7 will now be described with reference to FIGS. 2 and 3. Whem no current is supplied to the solenoid 7, the armature 8 is biased in the leftward direction as viewed in FIG. 2 by the elastic force of a helical spring 12 and hence the other end 8b of the armature 8 is kept in contact with the carriage stopper 9. The carriage 4 is attracted by the spring 6 (shown in FIG. 1 ) and is brought into contact with one end 8a of the armature 8. Thus, the magnetic head 2 is positioned at a standby position 14 near a CSS position 13 of the magnetic disk 1. Next, when a current is supplied to a coil 11 of the solenoid 7, the armature 8 is attracted toward the carriage as shown in FIG. 3 and hence the helical spring 12 is compressed. In this case, the carriage 4 is pushed by the one end 8a of the armature 8 and is moved in the rightward direction as viewed in FIG. 3. Thus, the magnetic head 2 is positioned at the CSS position 13 of the magnetic disk 1.

Figure 4:
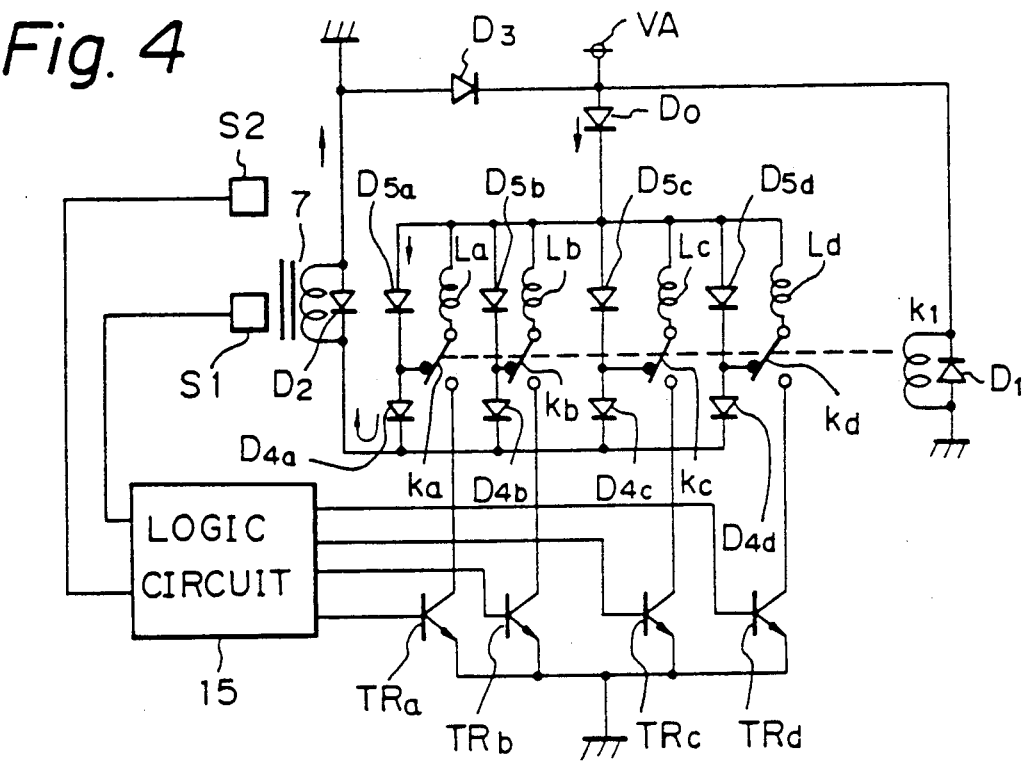
FIGS. 4 to 6 are electrical circuit diagrams showing drive circuits of the solenoids.

FIG. 4 is an electrical circuit diagram illustrating an electrical circuit for driving the solenoid 7. In the diagram, $D_0$, $D_1$, $D_2$, $D_3$, $D_{4a}$, $D_{4b}$, $D_{4c}$, $D_{4d}$, $D_{5a}$, $D_{5b}$, $D_{5c}$ and $D_{5d}$ denote diodes; $K_1$ indicates a voltage relay adapted to detect the presence or absence of a power source voltage VA supplied by the external power source; $L_a$, $L_b$, $L_c$ and $L_d$ are windings or coils of the DC direct drive motor 3; $S_1$ and $S_2$ Hall sensors adapted to detect the electrical angle of the motor 3; $TR_a$, $TR_b$, $TR_c$ and $TR_d$ transistors adapted to switch the phases of the windings $L_a$, $L_b$, $L_c$ and $L_d$ of the motor 3; and 15 a logic circuit adapted to switch the transistors $TR_a$, $TR_b$, $TR_c$ and $TR_d$ in response to outputs of the Hall sensors $S_1$ and $S_2$.

The operation of the drive circuit will now be described. When the power source voltage VA is applied, the relay $K_1$ is energized. Movable contacts $k_a$, $k_b$, $k_c$ and $k_d$ of the relay $k_1$ are connected to fixed contacts which are indicated as blank circles, respectively, in FIG. 4. The transistors $TR_a$ to $TR_d$ are sequentially switched in accordance with the electric angle of the motor 3 and the windings $L_a$ to $L_d$ are energized and the motor 3 is thereby caused to rotate. At the same time, a current is supplied from the power source voltage VA to the solenoid 7 through, e.g., the diodes $D_0$, $D_{5a}$ and $D_{4a}$, thereby energizing the solenoid 7.

Figure 5:
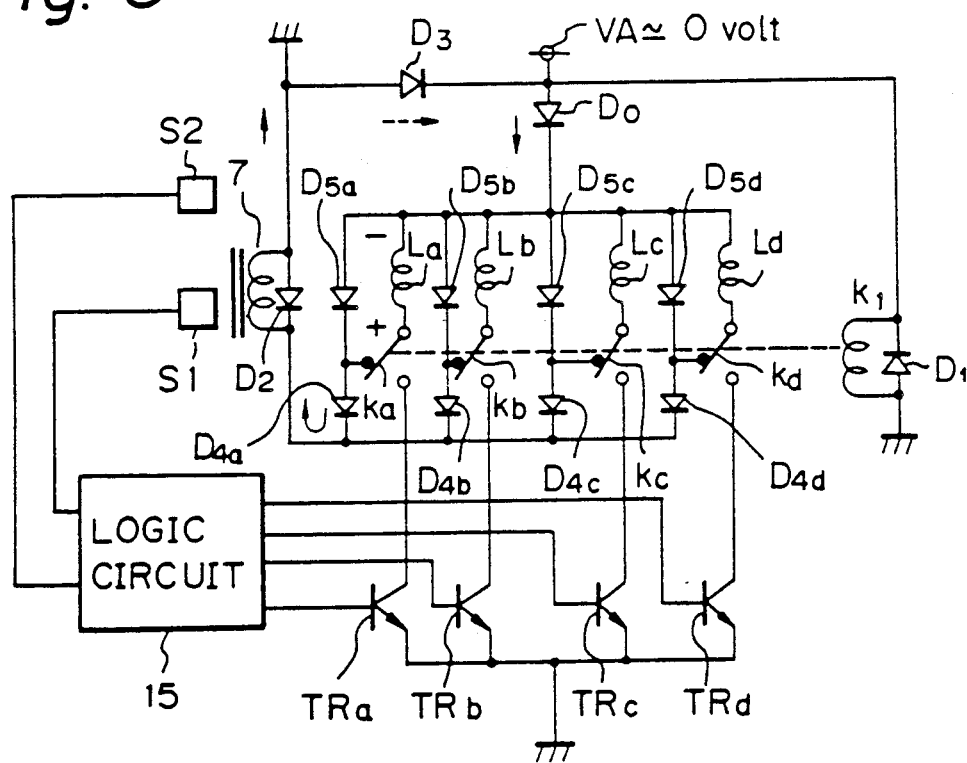

The case where the power source voltage VA is shut off will now be described with reference to FIG. 5. When the power source is shut off, the relay $K_1$ is made inoperative and the movable contacts $k_a$ to $k_d$ are connected to the fixed contacts which are shown as black dots in FIG. 5. However, during the rotation of the motor 3 (during the inertial rotation of the magnetic disk 1), it can operate as a power generator, so that electromotive forces can be induced in the windings $L_a$ to $L_d$. FIG. 5 shows the case where a positive voltage is generated in the winding $L_a$. At this time, a current flows to the solenoid 7 through the diode $D_{4a}$. Then, when the motor 3 continues to rotate and the electromotive force of the winding $L_a$ decreases, a positive voltage is generated in the winding $L_b$ of the adjacent phase and is rectified by the diode $D_{4b}$, so that current continuously flows to the solenoid 7. The diode $D_3$ is provided to protect a current feedback route of the solenoid 7 when the power source voltage VA is shut off.

Figure 6:
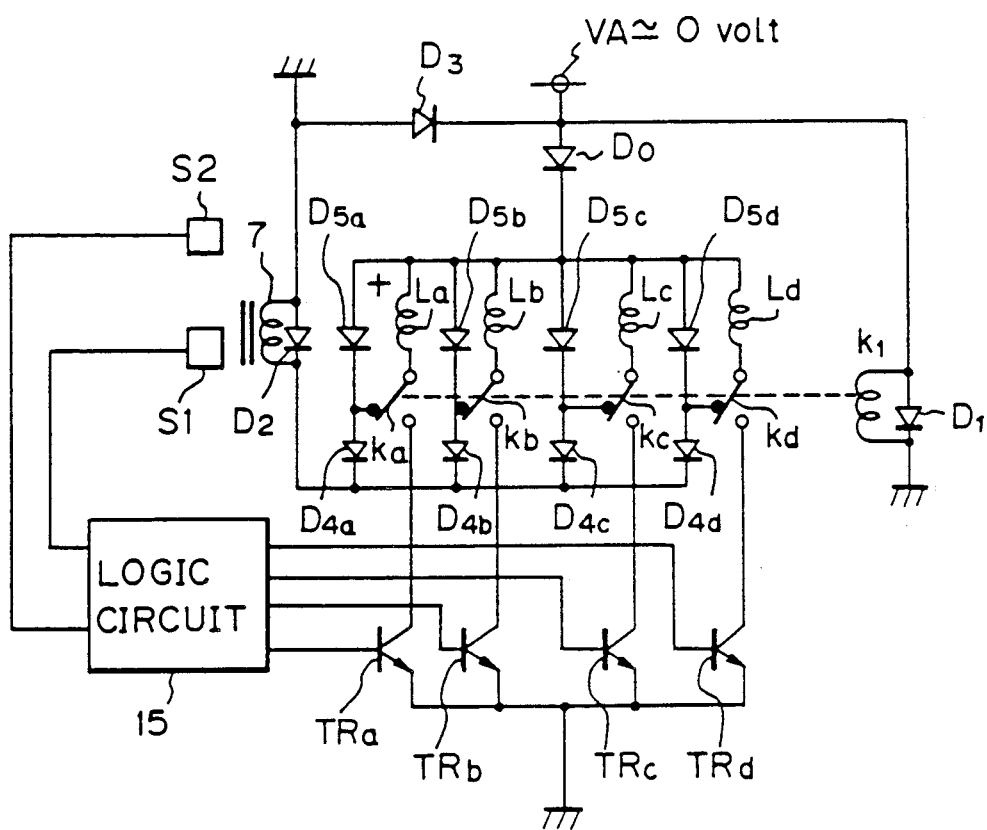

The case where a negative voltage is induced in the winding $L_a$ will now be explained with reference to FIG. 6. The negative voltage of the winding $L_a$ is applied to the diode $D_{5a}$ and a closed circuit can thus be formed. This operation functions as an electric braking for the motor 3. As the rotational speed of the motor 3 is reduced, the electromotive forces of the windings $L_a$ to $L_d$ also decrease, so that the operating state of the solenoid 7 cannot eventually be held.

The foregoing operations will be described with reference to FIG. 7. Assuming that the power source voltage VA is given by, e.g., a rated voltage of 12 volts, the relay $k_1$ is activated and a sufficient voltage is applied to the solenoid 7, so that the solenoid can be energized. As a result, the armature 8 drives the carriage 4 and the magetic head 2 is forced to the CSS position 13. Then, when the power source voltage Va is shut off, the relay $K_1$ is made inoperative or is in an OFF state. As explained above, however, a current which has been generated by the electromotive force induced in the motor 3 and has been rectified by the diodes $D_{4a}$ to $D_{4d}$ allowed to continuously flow through the solenoid 7.

Thus, the magnetic head 2 is held at the CSS position 13. After that, when the voltage which is applied to the solenoid 7 decreases to a level lower than a holding voltage VH (when the inertial rotation of the magnetic disk 1 stops) as the rotation of the motor 3 is braked, the armature 8 is released to move the carriage 4 so that the magnetic head 2 can be moved to the standby position 14. When the voltage is again applied, the magnetic head 2 is removed from the standby position 14 to the CSS position 13 by the energization of the solenoid 7, before the magnetic disk is rotated after passing a predetermined delay time $T_2$ of the relay $K_1$.

Figure 8:
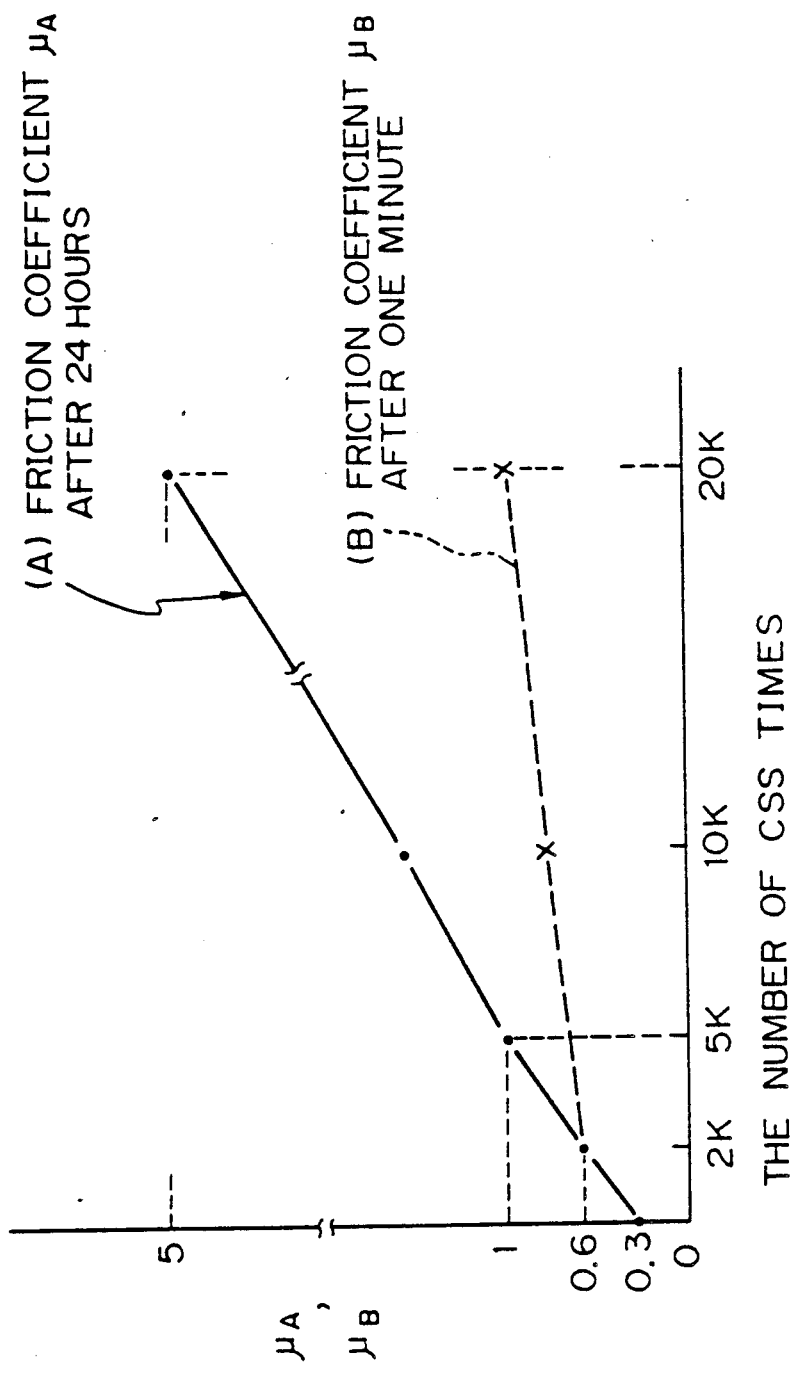
FIG. 8 is a graph showing changes in the coefficient of friction between a magnetic head and a magnetic disk.

The adsorption state between the magnetic head 2 and the magnetic disk 1 will now be described with reference to FIG. 8. FIG. 8 is a diagram showing changes in the coefficient of friciton of a disk/head system. The axis of abscissa denotes the number of times CSS operations are performed and the axis of ordinate indicates the coefficient of friction. In the diagram, the curve (A) indicates the friction coefficient $\mu_A$ after the operation of the disk/head system has been continued for 24 hours. It will be understood from the diagram that when the number of times CSS is performed is below 2,000, the friction coefficient $\mu_A$ is "0.6" or less, while when the figure reaches 20,000 times, the friction coefficient $\mu_A$ increases to "5". In general, when $\mu > 1$, such a state is called an adsorption state. Therefore, when the number of times CSS is performed is 5,000 or more, it can be said that the adsorption state has occurred. Assuming that n indicates the number of magnetic heads 2, $\mu$ is the friction coefficient, and N is the load, the load torque of the motor 3 needed for rotating the disk is represented by $n \cdot \mu \cdot N$. The starting torque $T_M$ is given as follows.

$$T_M > n \cdot \mu \cdot N$$

As the friction coefficient $\mu$ increases, however, if the starting torque $T_M$ decreases to $$T_M > n \cdot \mu \cdot N$$

a starting error may occur. It is therefore undesirable for the friction coefficient $\mu$ to change with any increase in the number of times CSS is performed if one wishes to ensure that the rotation of the motor can be started reliably.

The curve (B) in FIG. 8 shows a friction coefficient $\mu_B$ which is generated after operation is continued for one minute. It will be understood that even if the number of times CSS is peformed reaches 20,000, the friction coefficient $\mu_B$ will be 1 or less.

In the apparatus according to the invention, when the apparatus is stopped, the magnetic head 2 is maintained at the standby position 14 on the magnetic disk 1. Just before the rotation of the magnetic disk 1 is started, the magnetic head 2 is moved to the CSS position 13 on the magnetic disk by means of the solenoid 7 and the rotation of the magnetic disk 1 is started. On the other hand, when the magnetic disk 1 is stopped, the magnetic head 2 is held at the CSS position 13 by the force of the spring 6 and, during this period of time, the motor 3 rotating the magnetic disk 1 is braked, thereby stopping the rotation. After the rotation of the disk 1 stops, the solenoid 7 is deenergized and the magnetic head 2 is moved to the standby position 14.

As explained in connection with the embodiment, the magnetic head 2 can be shifted to the standby position 14, for a long time while the magnetic disk apparatus is in a standby state. Since it is not possible for the CSS operation to be executed with the magnetic head at the standby position 14, the friction coefficient can always be kept at a level of "0.3" or less. On the other hand, after the magnetic head 2 has been moved to the CSS position 13, the CSS operation is performed within a short time of less than one minute and then the head rises, so the friction coefficient can be held to a value of "1" or less as shown by the curve (B) in FIG. 8, and the occurence of starting errors can thus be avoided.

In the embodiment, the voltage relay $K_1$ is used to detect the power source voltage VA. However, a voltage detecting circuit consisting of an electronic circuit can be used instead to detect the voltage more precisely. On the other hand, the operation of the voltage relay $K_1$ is made operative later than the operation of the solenoid 7 by the delay time $T_2$ (shown in FIG. 7), thereby enabling the movement of the magnetic head 2 from the standby position 14 to the CSS position 13 to be executed more efficiently.

The operating direction of the armature 8 of the solenoid 7 is not limited to the moving direction of the carriage 4 but can be set to, e.g., the perpendicular direction as viewed in FIG. 9 which shows such an embodiment.

Reference numeral 8c denotes a cam attached to the other edge 8b of the armature 8.

Also, as shown in FIG. 10, an additional contact $k_0$ of the relay $K_1$ and a resistor R can be used in a drive circuit of the solenoid 7. By properly selecting the value of the resistor R, the power source voltage VA can be matched with the rated voltage of the solenoid 7.

FIG. 11 shows another arrangement of the CSS position 13 and standby position 14 relative to the magnetic disk 1. Slide surfaces 2A and 2B of the magnetic head 2 are spaced apart from each other and in this case the CSS positions and standby positions can be assigned to positions 13a and 14a and to positions 13b and 14b, respectively. In such a case, it is possible to set the movement of the magnetic head 2 to a relatively small amount as indicated at 2' (the movement of the carriage 10 is shown at 10').

in FIG. 1, the linear moving type carriage 4 has been shown as a mechanism for positioning the magnetic head 2. However, the invention can also be applied to the rotary type positioning mechanism without departing from the spirit of the invention.

What is claimed is:

1. A magnetic disk apparatus comprising:
    a magnetic disk adapted to have information recorded thereon and including an information recording portion and means defining separate predetermined and stand-by positions, said predetermined and stand by positions both being locations free of normal recording and reproducing information;
    means for rotating said magnetic disk;
    magnetic head means for recording and reproducing the information onto and from said magnetic disk;
    carriage means for moving and positioning said magnetic head;
    wherein, when the rotation of said magnetic disk is started, said magnetic head means rises from the predetermined position on said magnetic disk, and when the rotation of said magnetic disk is stopped, said magnetic head means comes to rest at said predetermined position;
    and control means for enabling said magnetic head to move between said predetermined position and the standby position and including means for moving the magnetic head from said predetermined position to said standby position once the rotation of said magnetic disk is stopped, and means for moving the magnetic head from said standby position to said predetermined position after initiation of said means for rotating but prior to the rotation of said magnetic disk whereby the tendency of said magnetic head to be affected by adsorption phenomenon is inhibited.

2. A magnetic disk apparatus as set forth in claim 1, wherein said control means includes additional carriage means which comprises solenoid means, said means for rotating includes power supply means and electric motor means operated from said power supply means, said solenoid means being energized by the electric power from said power supply means.

3. A magnetic disk apparatus as set forth in claim 2 wherein said predetermined position comprises the CSS position and said additional carriage means further includes means for holding said magnetic head at said CSS position by using electric energy which is generated in said electric motor means by inertial rotation thereof until the rotation of said magnetic disk is stopped after the electric power from said power supply means to said electric motor means has been shut off.

4. A magnetic disk apparatus as set forth in claim 3 wherein said additional carriage means enables the magnetic head to move between said CSS position and the standby position near the CSS position, said standby position being a position at which a CSS operation cannot be executed.

5. A magnetic disk apparatus as set forth in claim 4 wherein, when the electric power from said power supply means to said electric motor means is shut-off and the rotation of said magnetic disk is stopped, said magnetic head is moved from said CSS position to said standby position.

6. A magnetic disk apparatus as set forth in claim 5 wherein, when the electric power is supplied from said power supply means to said electric motor means, said magnetic head is moved from said standby position to said CSS position prior to the rotation of said magnetic disk.

7. A magnetic disk apparatus, comprising:
    a magnetic disk adapted to have information recorded thereon;
    a power supply means;

electric motor means for rotating said magnetic disk by means of electric power which is supplied from said power supply means;

magnetic head means for recording and reproducing the information onto and from said magnetic disk wherein normally when the rotation of said magnetic disk is started, said magnetic head rises from a predetermined CSS position, and when the rotation of said magnetic disk stopped, said magnetic head comes to rest at said predetermined CSS position;

a first carriage means for moving and positioning said magnetic head means over said magnetic disk from said CSS position to a data transfer position by means of electric power which is supplied from said power supply means;

a second carriage means coupled to said first carriage means for moving said magnetic head means between said predetermined CSS position and a standby position;

control means coupled to said first and second carriage means for enabling said first and second carriage means to move and position said magnetic head;

whereby when said power supply is turned off rotation of said magnetic disk is stopped and said second carriage means moves said magnetic head from said CSS position to said standby position; and time delay means for enabling the second carriage means to move said magnetic head means from said standby position to said predetermined CSS position prior to said electric motor being energized to rotate said magnetic disk when the power supply is switched on.

8. A magnetic disk apparatus as set forth in claim 7 wherein said second carriage means further includes means for holding said magnetic head means at said predetermined CSS position by using electric energy which is generated in said electric motor means by inertia rotation thereof until the rotation of said magnetic disk is stopped after the electric power from said power supply means to said electric motor means has been turned off.

* * * * *